4896X
J. McClintic,
Mortising Machine.
Patented Oct. 8, 1827.
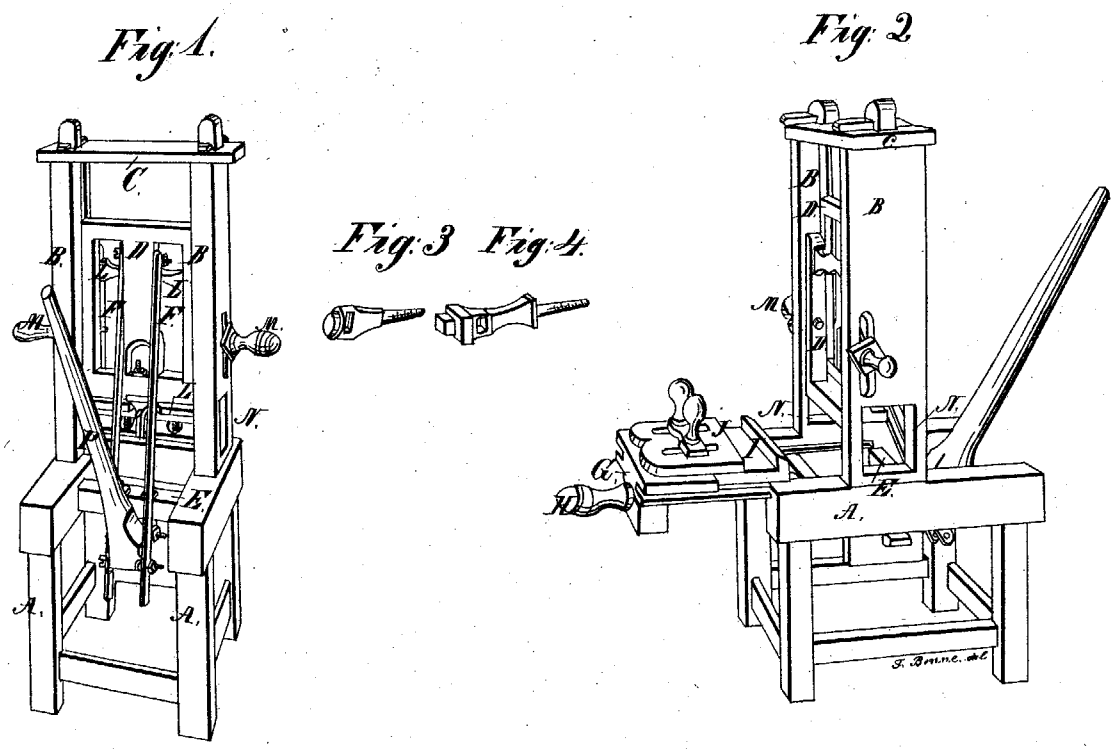
A.M. PHOTO-LITHO. CO. N.Y. (OSBORNE'S PROCESS)

2256

4896X 153 153.

John McClintic
Letters Patent

Patented Oct. 8th 1827.
Reissued Oct. 27. 1835

The Schedule referred to in these Letters Patent and making part of the same containing a description in the words of the said John McClintic himself of his improvement in the machine for mortising and tenoning Timber, for which Letters Patent were granted dated the eighth day of October 1827, which Letters Patent being hereby cancelled on account of a Defective Specification.

---

To all to whom these Presents shall come

Be it known that I John McClintic of Chambersburg in the County of Franklin and State of Pennsylvania have invented a new and useful improvement in the machine for mortising and tenoning timber. That my first Patent has been canceled by me in consequence of a defective specification and not with fraudulent intent.

The following is a full and exact description thereof; 1st. There is a frame erected say two feet four inches high and three feet long & two feet wide this being sufficiently large for ordinary mortising & tenoning viz. Doors, Shutters, Sash, Venetian Blinds, Bedsteads, Bureau & Table legs &c. but if intended for heavier work will of course be encreased in size. The stuff of which the above frame or bench is made is of oak or other hard wood, scantling about five inches by four square. On this frame is erected two studs or upright posts of hard wood of about two & half inches thick & eight or nine inches wide mortised through bench sides and double keyed below. These posts stand above the frame from three to four feet according to the kind of work the machine is intended for.

There is a top rail framed from post to post & keyed above. These posts are grooved or rabitted in centre of inner sides about one fourth of an inch in depth and two inches wide for the chisel carriage to slide up and down in (Instead of upright posts being made of plank eight or nine inches wide as spoken of they may be framed, and the parts which are rabitted, screwed to the rails connecting the side pieces of the posts 2d. There is a chisel carriage framed of hard wood of the breadth of the

4896X machine, between the rabbets or grooves of upright posts and about two feet in length with five rails viz. two side rails (which are those that slide in grooves of upright posts) a top rail a bottom and middle rail. The bottom rail is from three to four inches thick & three inches wide, with a slip mortise across it in centre with an iron plate above and one below. Up through this motise the tong or shank of the chisel or chisels are put and fastened on upperside of rail by nut that screws on chisel shank. The middle rail of this carriage is about three and a half inches wide tenoned into top and bottom rails; where it is tenoned into bottom rail, it is double tenoned, straddling the place or mortise where chisel is fastened and is cut away about four inches up between the tenons so as to admit a wrench to tighten the chisels. 3d. There is a rail framed through sides of bench, flush below & as high as grooves in bench pieces, where the table slides about two and half inches thick up through the rail from the lower side is put two eye bolts, distant from each other the breadth of whatever your middle rail of chisel carriage is, and stand below the rail about three inches between these eye bolts hangs a lever fastened by an iron pin passing through the eye bolts and eye plates that are rivetted to sides of lever with a nut screwed on pin up against the eye bolt.

4th. From near the top of middle rail of chisel carriage to the heel of lever there are two straps of iron about an inch & quarter wide and an eighth thick and about three feet long fastened in each place by an iron pin and nutted close to sides of middle rail, and plates on lever. These straps are the movers of the chisel carriage, as you raise the lever the carriage rises as you press down lever, chisel is forced into the wood.

5th. There is a sliding table which slides between bench sides which are grooved within about 1/8 of an inch of upper edge. This table is moved in and out by means of a tail screw which passes through a rail that is framed thro' bench sides same as one where the lever hangs. This table brings your piece to the proper place to be mortised or tenoned. On this table there are two guide pieces, the one permanently fixed, the other movable, so that when you put in your piece to work upon, it is placed against the fast guide the moving guide is then placed against the piece and there tightened; which is done by means of two screws that pass thro' loop holes in sliding guide and nut in table. Instead of moving your
piece between the guides spoken of above, there is a box of about two & a half feet
long five or six inches in depth and about four inches wide, the sides of this box
are grooved near the lower edge, and in those grooves, tongues that are on the guide
pieces (spoken of) work alowing the box to slide fair thro' the machine, also
preventing the box from raising as the as the chisel is raised out of cut.
6th. The two upright posts have each a large opening in them according to
the breadth or heigth wished. The lower edges of these openings are flush with top
of moving table. Thro' those openings your piece to be mortised or tenoned moves
which is fed to the chisel by hand that is not engaged with the lever. When the
box is used the stuff is held in box by a screw through side of box pressing
the piece against the other side of box. The box is then passed thro' the machine
by a rack and pinion wheel, the rack is screwed to side of box, above the groove
On the table there is a short stud erected thro' this stud, a handle passes, and
on the end a pinion wheel about an inch & quarter in diameter which geers
into rack on side of box. As you turn this handle, your box slides thro' the
machine and with it your piece, which is held firm in box. There are two
stirrups of iron that come over the sides of ~~the~~ box that may be shifted to
whatever breadth of stuff you are working on and tightened by screws
these stirrups or pieces prevent your piece from raising in box as the chis-
el is raised out of cut. To commence a mortise for instance on a door
stile of hard wood which is to be mortised thro', you bore two holes (soft
wood not necessary to bore) of the breadth of your mortise, half the depth of your
stile, viz. one on each side of your piece at the reversed ends of mortise com-
menced at one hole & mortise half the depth of your piece and as far as your
heading scribe then turn your piece end for end keeping the same side to you and
mortise the other half When your piece is taken out, you can with a core driver
knock out all the chips: If you wish to mortise thro' from one side you will then
bore one hole thro' your piece. On the depth you want if not through.
7th. For tenoning if there be a shoulder wanted on both sides of tenon, you place
two chisels in your machine as far apart as the thickness you want your tenon
or one chisel if made in one piece described hereafter. In cutting down your tenon

4896 X you will take out of about one fourth of an inch, leaving about one fourth of an inch
stand before you come to shoulder, which quarter is removed by a firmer chisel af-
ter the shoulder is sawed down, which is not done untill tenon is cut. When you cutting
tenons or mortising thro' from one side you will have a piece of stuff fitted to inside
of box for chisel to cut against, that your box may not be injured, this piece is screwed
down in box; For the greater ease of moving the stile from mortise to mortise
(where they are long and heavy) there is a piece of stuff about half inch or three
quarters thick fitted to breadth of box inside and screwed down in it (screws
countersunk projecting beyond the box at each end some two or three feet or
what may be tho^t. necessary. For bevel mortising there is a false bottom fitted
to breadth of box inside rounded at one end and a pin of iron run through
sides of box, and false bottom, this bottom is raised at the loose end to whatever
splay wanted is kept at that pitch by wedge between the two bottoms or screw up
through lower bottom or otherwise. This bottom may be taken out when not mor-
tising bevel work which will increase the depth of your box if wanted.

8th. The chisels used in this machine are similar to the common mortising
chisels with the difference that the tongs or shanks are square and a saw cut
on tong to fasten them in bottom rail of chisel carriage. There are also other chisel
used in the machine, viz. A chisel for mortising for the slots of Venetian shut-
ters, this chisel is composed of a socket made with an oblong hole in it to re-
ceive the chisel, which is two half bitts of whatever size wanted and fastened
in socket by two screws running thro' side of socket against the bitts and
pressing them tight together against the other side of socket. This socket
has a round tong so that it may be turned in machine to suit right or left
stiles. Also a square or four sided chisel which is intended for sash, viz. the small
square mortising cross munters & meeting rails; for this kind of chisel there is
a hole bored within the square of the mortise the chisel then cuts down the four
sides the block or chip, sticking in the chisel is forced out of it by a crooked tool
entering the chisel above the block. There is also used in machine what I
call double & treble cutting chisels; which chisels are used (principally) when
working on stuff in which the core packs rather tight, Also used at times
when the mortising does not go through. One of these chisels is similar to the 4.896 X 157 common or first chisel spoken of with this difference that on the back part
of it, it is rabitted down about half the breadth & half the thickness of chisel,
which forms two cuts, the thick chisel as I shall call it standing about one
fourth of an inch below the short one (when in the machine) as this chisel is
fanded into the wood, the chip which is cut by the short part is held on one side
by the side of the long chisel and on the other side by the standing wood of the
piece being mortised which forms a case for this chip, and is brot. out as the
chisel is raised out of curf. The treble cutting pretty much like the last described
with this difference it is rabitted down in middle making as it were three chisels,
the two outside ones being about a quarter of an inches longer than the middle one;
In this chisel the chip of the short chisel is brot. up between the two long chisels - In
forming the box or rabetted part in this last chisel you will make it a little wider
as you go upwards so that the chip will force out easily by the succeeding chip if
any has stuck in - also, a double faced chisel which is as if you would place two
chisels together back to back, this chisel also is used for sash stuff as heretofore
described. The two are bolted together by screw bolts passing through both - or there
may be socket similar to the Venetian chisel socket so that different sizes may
be used in it.

Mortising and tenoning may be done in many ways to suit the gate or part which
holds the chisel or chisels may be worked by Rack & Pinion wheel crank & balance wheel
or treadle, & spring to raise the gate or part which holds the chisel.

Description of Machine.

When the rack & pinion make is used if made of wood is very similar to the
make of that already described in many or most of its parts with this difference. That
the upright parts or studs are not more than seven inches wide except at that part
where the box (which holds the stuff) passes through. Neither need the machine be
made as wide between the studs. The bench may be framed about one foot four out to out;
The upright posts if made of wood mortised thro' bench sides and as before keyed below
but if of casting may be bolted to top of bench sides which may also be made of casting
together with table, &c. The upright posts or studs have mortises made in them or loop
holes through which the tenons of two rails connecting the studs and are keyed or netted
against the outside of studs. These loop holes are for the purpose of changing the height of

4896X when necessary, the rails shoulder fair on sides of studs have each a hole through
ntre about an inch and half in diameter. The Rack which is that part which
the chisel is of steel is about one foot ten inches long and about one & one fourth of an
in diameter in its thickest part, which is from the centre each way about four inches
ing eight inches; this part is turned into grooves about a quarter of an inch deep,
ch forms coggs around the shaft. The other parts of chisel rack are turned
n to a little more than an inch in diameter, which is seven inches at
end of Rack. These plain parts move through the holes in rails descri-
above, when the pinion wheel is worked. There are two plates of metal dril
precisely to fit the plain parts of rack and are bolted to tops of rails when
rack is plumb. These plates may be about half inch thick. There is a
n wheel of seven inches in diameter (this being the most useful size) and
inch thick, coggs cut fine, and geered in the chisel rack. The shaft on
ch the wheel is fastened is turned with a flange or shoulder on it that
wheel may be fastened to and kept from turning on the shaft; The bearing
he shaft, are fastened to the sides and edges of upright studs and are so
structed as to be moved in or out up or down, so as to geer to proper pitch
f wanted a different sized wheel. The pinion wheel which is seven inches
diameter being turned one fourth round gives to chisel rack a perpen-
ular motion of five and a half inches which is considerably more
n is generally wanted when you mortise on both sides of piece. If you
h to mortise say through a stile of eight inches from one side, you can
ce on your shaft a wheel of ten in diameter; This with a little more mo-
n of wheel will carry you the eight inches deep. In and through the pin-
wheel near the outer edge, there are holes drilled on the same circle through
ich there is a small screw bolt put which fastens your handle against
e of pinion. Your handle is a bar of iron about three and half feet long,
inches wide where it is fastened to wheel and tapered towards end to
ut an inch the bar about three eights or half inch thick, hole drilled
o' filling the shaft with small hole suiting the holes in wheel so as to
ing pitch. At the end next the wheel it will extend a little beyond the wheel,
ve a hole drilled through for the purpose of attaching a weight or spring that the Rack may stand when lifted. The chisels used in this machine are the same as those already described with this difference that the tongs or shanks are all round and fit into chisel rack which is bored in centre at each end about three inches in depth, the holes about half inch diameter and a little tapered with holes bored thro' for the purpose of knocking out tool.

The lower part of rack which moves in lower rail is flattened on two opposite sides to about one sixth of its diameter on each square. The use of the holes in the other end of Rack is for the purpose of fastening a spring to raise the rack if the machine is worked by the foot, Or that if the rack is placed horizontally that there may be a chisel in each end and working on two stiles, in which case the lever will be double length extend alike beyond the wheel, that they are assisting each other. The flat parts of rack, are for the purpose of changing the direction of the face of the chisel by turning the rack round; There is a spring fastened to top or bottom of the rail, which spring lays fair against the square part without pressing it hard; which spring gives out as you wish to turn the rack round.

The sliding table of the machine where the rack and pinion make is used, differs a little from the other make in this that the little stud which has the small wheel on which moves the box thro' the machine is erected on the table on the side next the tail screw; also the screw which tightens the piece in box; all being at the end you are working at. In the other make the tail screw is at oposite end from where the lever is fixed; Instead of moving the box through the machine with rack & pinion by hand, there may be a feeding part attached that will feed itself when machine is worked, this may be done in many ways for instance, the rack and pinion may be worked similar to saw mill, or it may be done by rollers or the piece or the part that it is fasten.d to may be shoved by screw or endless screw; also the holes which are necessary to be bored for mortising hard wood, or using any particular chisel may be done by attaching a boring machine; but the more you add, the more likely to be out of repair. For if the machine fed itself it must do it at some uniform stroke, say eighths or quarters of inches, it would sometimes fall short or go beyond the heading scribe whereas if it worked by the rack and pinion or any other way by hand you can take much or little

4896X d, according to the stuff you working on – The aforesaid machinery may
orked by water, steam, horse, hand, or any other power, that may answer by
ling the necessary gear – That described being used by hand.

Operation of Rack & Pinion Machine.

When you place your piece in the box, and tighten it there by the screw through
of box, your sliding table on which the box rests, is moved in or out, bring
the piece in box to the proper place to be acted on; you then let your chisel,
ich is in the rack rest on top of piece; give your lever what ever inclination
choose by changing the thumb screw pin (which passes through wheel &
) into a different hole on wheel higher or lower as you may want it. If the
rtise is to be deep, it will be best to set the lever about one eighth of the circle
to wheel above level. This when you have pressed your lever or handle to one
th of the circle below level; will give one fourth of wheel or five and half inch
eep.

Where the machine is operated on by the foot, it will be necessary to affix
eadle connected with the part which holds the chisel or with the upper lever
andle; Further it will be necessary where foot is used for forcing the chisel
the wood that there be a spring or weight sufficiently strong, or heavy to raise
gate or part which holds the chisel out off the cut, when the pressure of the
t is taken off the treadle. If spring is used it may be of wood, steel or iron
ny thing else of sufficient strength and elasticity and may be attached
rame of machine, in such a way as to lift the part which holds the
el. In the rack & pinion machine the spring may be a spiral spring
de of strong wire, and may be attached to top of chisel rack or set below
wheel operating on the rack, in this case the wheel is pulled downwards
such way that the rack is forced upwards, besides spring there may be a
ght attached to wheel or to the end of handle next to wheel which weight
little heavier than the chisel rack, this weight being necessary to balance
rack, that it may stand in any position where the hand is used instead
he foot. Instead of applying springs or weight for the purpose of raising
sel out of curf or cut, they may be applied so as to force it into cut in many
ys one of which may be in this way viz. By hanging a weight to lever as far out on it as will force the chisel to cut & to be raised out of cut, by crank of a wheel, or by wipers on a shaft that may be so shifted as to raise the chisel no higher than is necessary; besides the chisels that are particularized. Chisels of any shape or form may be used in the machine. There may be a rack used separate from the part holding the chisel the rack in which case would be stationary. that is, it would not turn round, the socket or part holding the chisel having but one motion, that is that of turning round changing the face of chisel or the direction of it but not sliding up and down as the other described. that motion will be in sides of upright posts. The rack turned on shaft is pref erable because bringing your pressure more directly above the chisel.

What I claim as my own invention and not previously known in the above described machine is the manner in which the parts which hold the chisels are constructed. Also the manner, in which they are worked viz. The straps connecting the chisel carriage and lever the holes in lower parts of straps for changing to different breadths of stuff and keep the lever as horizontal as will give you the necessary depth.

Also, the Rack & Pinion, viz. the chisel rack & wheel which works it, the manner & make of, and mode of operating, viz. the turning the rack round, bringing the face of the chisel, in oposite direction for heading down; Also the sliding table bringing the piece which is in the box to the guaging or proper place to be worked on, Also the box which holds the stuff & the manner of moving it; Also the round tong on chisel; Also the make of socket for Venitian shutter, chisels & bitts; Aso my four sided chisel; Also my double cutting chisel; Also my treble cutting chisel; Also the two faced chisel; Also in operating by tread and spring.

Witnesses
David Schoolfield
Robert Holland

John McClintic

Cop.
W.G.

Drawing for 1821 [illegible]
a. Portfolio

4125 Words